US008076880B2

(12) United States Patent
Hiramine

(10) Patent No.: US 8,076,880 B2
(45) Date of Patent: Dec. 13, 2011

(54) MOTOR CONTROL DEVICE

(75) Inventor: Mikihiro Hiramine, Kariya (JP)

(73) Assignee: Denso Corporation, Kariya (JP)

( * ) Notice: Subject to any disclaimer, the term of this patent is extended or adjusted under 35 U.S.C. 154(b) by 482 days.

(21) Appl. No.: 12/412,454

(22) Filed: Mar. 27, 2009

(65) Prior Publication Data

US 2009/0256509 A1    Oct. 15, 2009

(30) Foreign Application Priority Data

Apr. 10, 2008  (JP) ................................. 2008-102416

(51) Int. Cl.
*H02P 6/14*  (2006.01)
*H02P 27/04*  (2006.01)
*H02P 6/08*  (2006.01)

(52) U.S. Cl. ......... 318/400.13; 318/400.02; 318/400.04; 318/400.32; 323/282; 323/284; 363/65; 375/238

(58) Field of Classification Search ............ 318/400.13, 318/400.02, 400.04, 400.32, 432, 434; 323/282, 323/284; 327/184; 375/238; 363/65
See application file for complete search history.

(56) References Cited

U.S. PATENT DOCUMENTS

| 5,099,138 | A  | * | 3/1992  | Fukunaga ..................... 327/109 |
| 5,874,818 | A  | * | 2/1999  | Schuurman .............. 318/400.04 |
| 7,288,916 | B2 | * | 10/2007 | Mitsuki ........................ 318/723 |
| 7,714,624 | B2 | * | 5/2010  | Takasu et al. ................. 327/110 |
| 7,782,037 | B2 | * | 8/2010  | Ohtani et al. ................. 323/284 |
| 7,944,720 | B2 | * | 5/2011  | Suzuki et al. ................... 363/65 |
| 2004/0129957 | A1 | * | 7/2004  | Takahashi et al. ............ 257/232 |
| 2005/0001582 | A1 | * | 1/2005  | Goto et al. .................... 318/802 |
| 2005/0025231 | A1 | * | 2/2005  | Mitsuki ........................ 375/238 |
| 2006/0113937 | A1 | * | 6/2006  | Hidaka et al. ................. 318/432 |
| 2007/0029959 | A1 | * | 2/2007  | Ta et al. ....................... 318/432 |
| 2007/0030705 | A1 | * | 2/2007  | Yamamoto et al. ............. 363/41 |
| 2007/0176575 | A1 | * | 8/2007  | Nawa et al. ................... 318/800 |
| 2009/0051346 | A1 | * | 2/2009  | Manabe et al. ............... 323/363 |

(Continued)

FOREIGN PATENT DOCUMENTS

JP           09-093986        4/1997

(Continued)

OTHER PUBLICATIONS

Japanese Office Action dated Jan. 5, 2010, issued in corresponding Japanese Application No. 2008-102416, with English translation.

*Primary Examiner* — Paul Ip
(74) *Attorney, Agent, or Firm* — Nixon & Vanderhye P.C.

(57) ABSTRACT

A motor control device has a three-phase bridge circuit, a driving circuit, and a microcomputer. The three-phase bridge circuit has three pairs of MOSFETs for U, V, and W phases of a three-phase AC motor as a control target. The microcomputer has a dead time set value storage unit and a PWM signal generation unit. The PWM signal generation unit generates a PWM signal with a dead time including a response characteristics of the pair of MOSFETs for each of U, V, and W phases of the AC motor based on a three-phase voltage instruction value supplied from an outside device and the dead time set value stored in the dead time set value storage unit. The PWM signal generation unit outputs the PWM signal for each phase to the driving circuit. This independently adjusts the dead time for the MOSFETs for each phase.

3 Claims, 11 Drawing Sheets

U.S. PATENT DOCUMENTS

| | | | |
|---|---|---|---|
| 2009/0066384 A1* | 3/2009 | Suzuki et al. | 327/184 |
| 2009/0134822 A1* | 5/2009 | Hamasaki et al. | 318/400.04 |
| 2009/0134826 A1* | 5/2009 | Hamasaki | 318/400.32 |
| 2009/0146590 A1* | 6/2009 | Hamasaki | 318/400.02 |
| 2010/0134053 A1* | 6/2010 | Yamada et al. | 318/162 |
| 2010/0244802 A1* | 9/2010 | Alexander | 323/284 |
| 2011/0156632 A1* | 6/2011 | Cheng et al. | 318/808 |

FOREIGN PATENT DOCUMENTS

| | | |
|---|---|---|
| JP | 2001-218479 | 8/2001 |
| JP | 2006-158126 | 6/2006 |
| JP | 2007-143229 | 6/2007 |

* cited by examiner

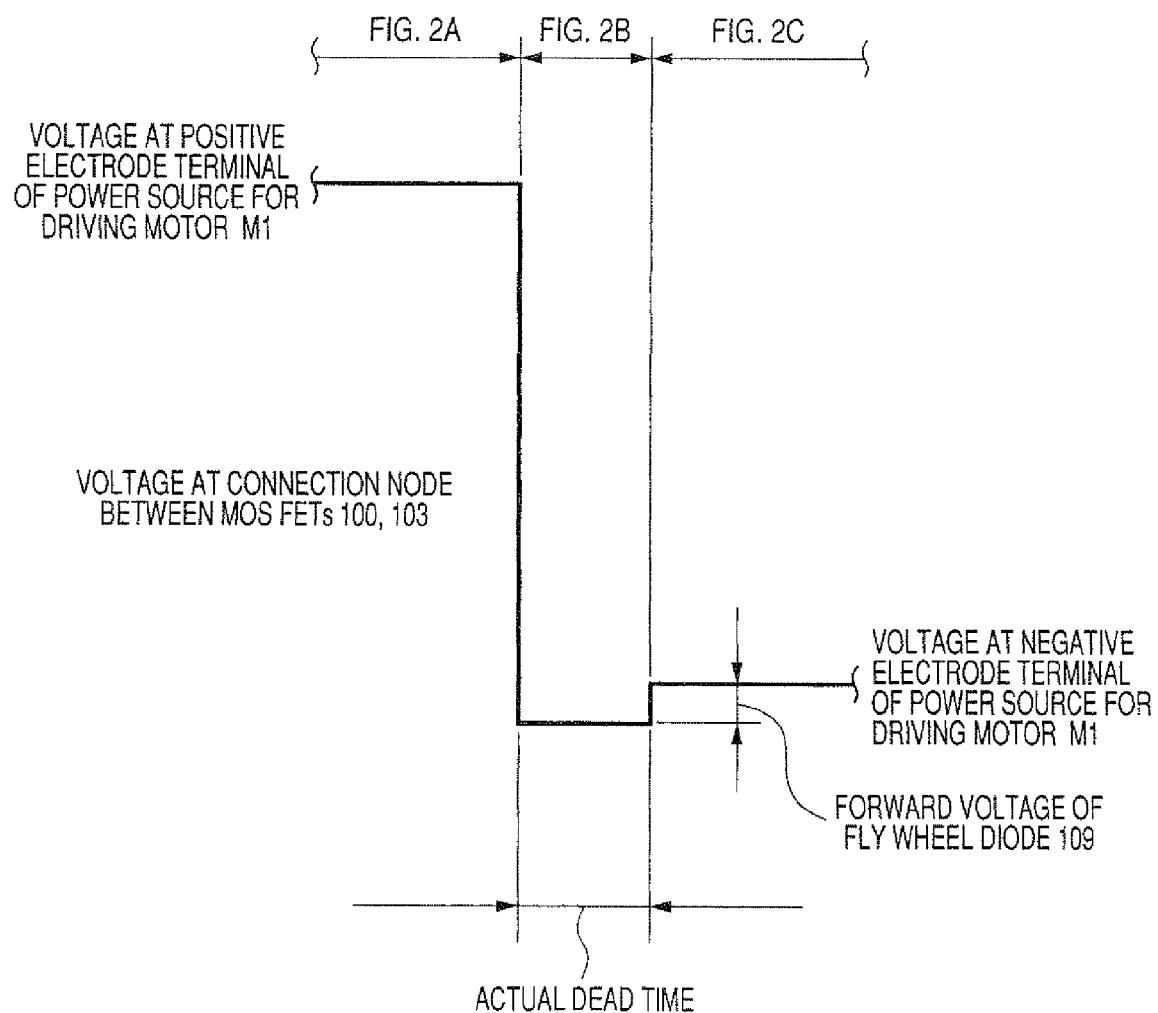

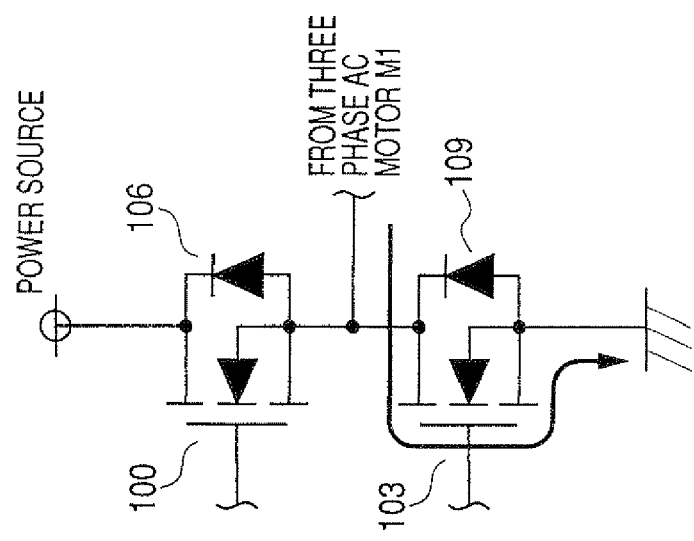
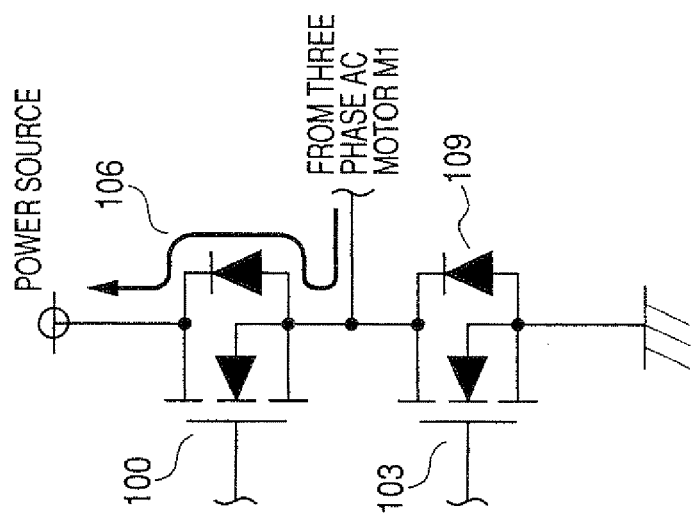
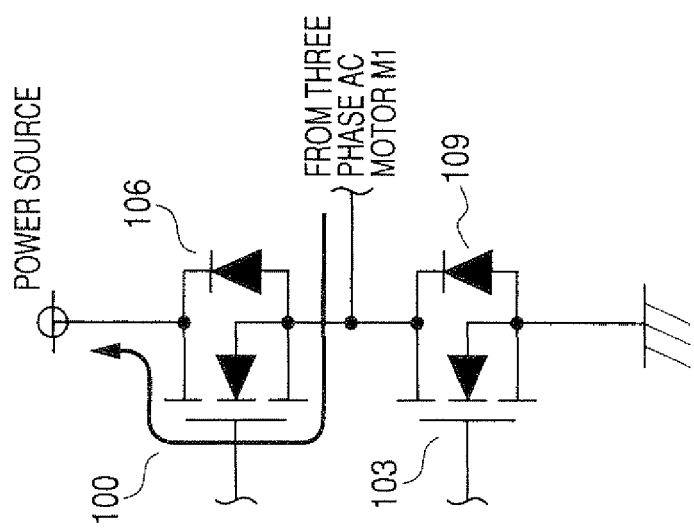

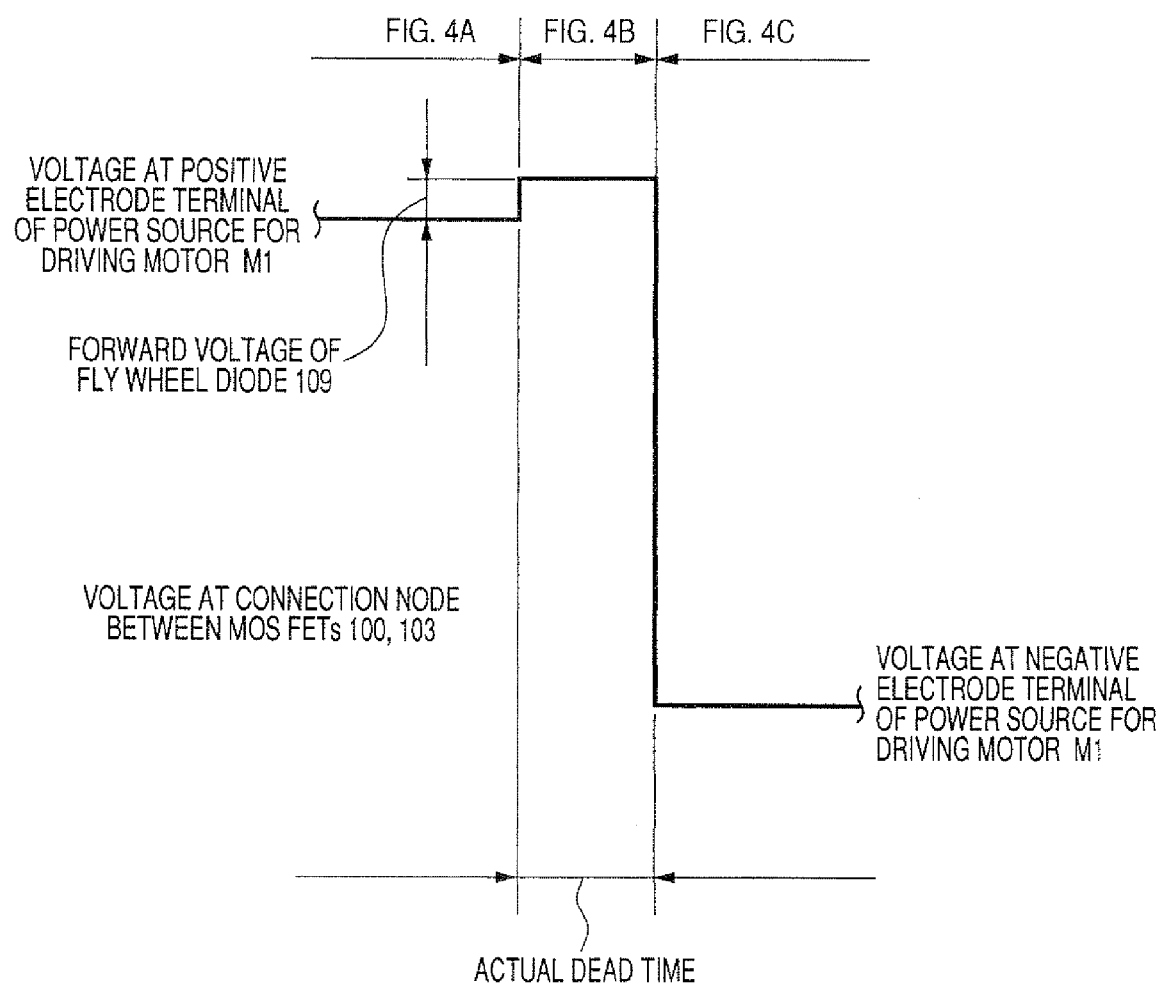

MOTOR CONTROL DEVICE

CROSS-REFERENCE TO RELATED APPLICATION

This application is related to and claims priority from Japanese Patent Application No. 2008-102416 filed on Apr. 10, 2008, the contents of which are hereby incorporated by reference.

BACKGROUND OF THE INVENTION

1. Field of the Invention

The present invention relates to motor control devices equipped with switching elements to control the operation of a multi-phase AC motor such as a three-phase AC motor mounted onto a vehicle. In particular, the motor control device generates pulse width modulation (PWM) signals to turn the switching elements on and off in order to control the operation of the multi-phase AC motor.

2. Description of the Related Art

For example, Japanese patent laid open publication No. JP 2006-158126, as one of related-art techniques, discloses a motor control device equipped with a plurality of switching elements for controlling a three-phase AC motor mounted on a vehicle. The motor control device instructs the switching elements to turn on and off in order to control the operation of the three-phase AC motor. The motor control device shown in JP 2006-158126 is comprised of an inverter unit and a PWM signal calculation unit. The inverter unit is equipped with a switching circuit. The switching circuit is composed of three groups of MOS field effect transistors (MOSFETs) placed in parallel. Each group of MOSFETs corresponds to each phase of the three-phase AC motor. The MOSFETs in each group is connected in series.

The PWM signal calculation unit generates PWM signals and transmits the PWM signals to the inverter in order to turn the MOSFETs on and off. In particular, the PWM signal includes a dead time. During the dead time, the MOSFETs connected in series are simultaneously tuned off. The dead time of each PWM signal is same. That is, the dead time of each group of the MOSFETs is a same period of time.

The more the time length of the dead time in the PWM signal is increased, the less the on-period in the PWM signal to turn the MOSFET on is decreased. This means decreasing the period of outputting the available voltage or the available current. As described above, because the dead time in each PWM signal has the same value, namely has a same period of time, it is impossible to decrease the length of the dead time in the PWM signal even if one MOSFET in the switching circuit has superior response characteristics and this MOSFET allows the dead time to have a short period of time when a MOSFET in another switching circuit for another phase does not correspond to the short length of the dead time. Thus, the conventional motor control devices do not cope with, namely, do not adopt each response characteristics of the MOSFETs, and thereby makes it difficult to expand the output voltage range or the output current range of the motor.

SUMMARY OF THE INVENTION

It is an object of the present invention to provide a motor control device capable of expanding the range of an available output voltage or an available output current by responding accurately to each response characteristic of switching elements.

To achieve the above purpose, the present invention provides a motor control device capable of controlling the operation of a multi-phase AC motor. The motor control device has a multi-phase bridge circuit and a control means. The multi-phase bridge circuit has a plurality of pairs of switching elements such as MOSFETs. The pair of switching elements for each phase is connected in series and provided for each phase of the motor. The pairs of switching elements for the multi-phases of the motor are connected in parallel to each other. A connection node between each pair of switching elements for each phase is connected to the motor. The control means sets a dead time of the pair of switching elements connected in series for each phase of the motor in order to simultaneously turn the pair of switching elements off. The control means instructs the switching elements in each pair to turn on and off, and adjusts the dead time of the switching elements in each pair for each phase in order to control the operation of the motor.

One of the important features of the present invention is to adjust the dead time of the switching elements in each pair for each phase of the motor. For example, the control means adjusts the dead time for the pair of switching elements connected in series for each of U, V, and W phase of an three-phase AC motor. This control can use adopt a response characteristics of each switching elements such as MOSFETs, and can expand the output voltage range or the output current range of the motor.

The configuration of the motor control device according to the present invention allows the control means such as a microcomputer to independently set the dead time of the pair of switching elements for each phase of the motor. This allows the control means to independently adjust an optimum dead time of the pair of switching elements while considering the response characteristics of each switching element for each phase. It is thereby possible to expand the output range of the available output or the available current of the motor while taking full advantage of the response characteristics of each switching elements for each phase of the motor

BRIEF DESCRIPTION OF THE DRAWINGS

A preferred, non-limiting embodiment of the present invention will be described by way of example with reference to the accompanying drawings, in which:

FIG. 3 a diagram showing a voltage waveform at a connection node between the pair of MOSFETs to explain the method of detecting the actual dead time of the MOSFETs shown in FIG. 2A to FIG. 2C;

FIG. 4A to FIG. 4C are circuit diagrams showing another method of detecting an actual dead time of MOSFETs in each pair in the three-phase bridge circuit in the motor control device according to the first embodiment of the present invention;

FIG. 5 is a diagram showing another waveform at a connection node between the pair of MOSFETs to explain another method of detecting the actual dead time of the MOSFETs shown in FIG. 4A to FIG. 4C;

DETAILED DESCRIPTION OF THE PREFERRED EMBODIMENTS

Figure 1:
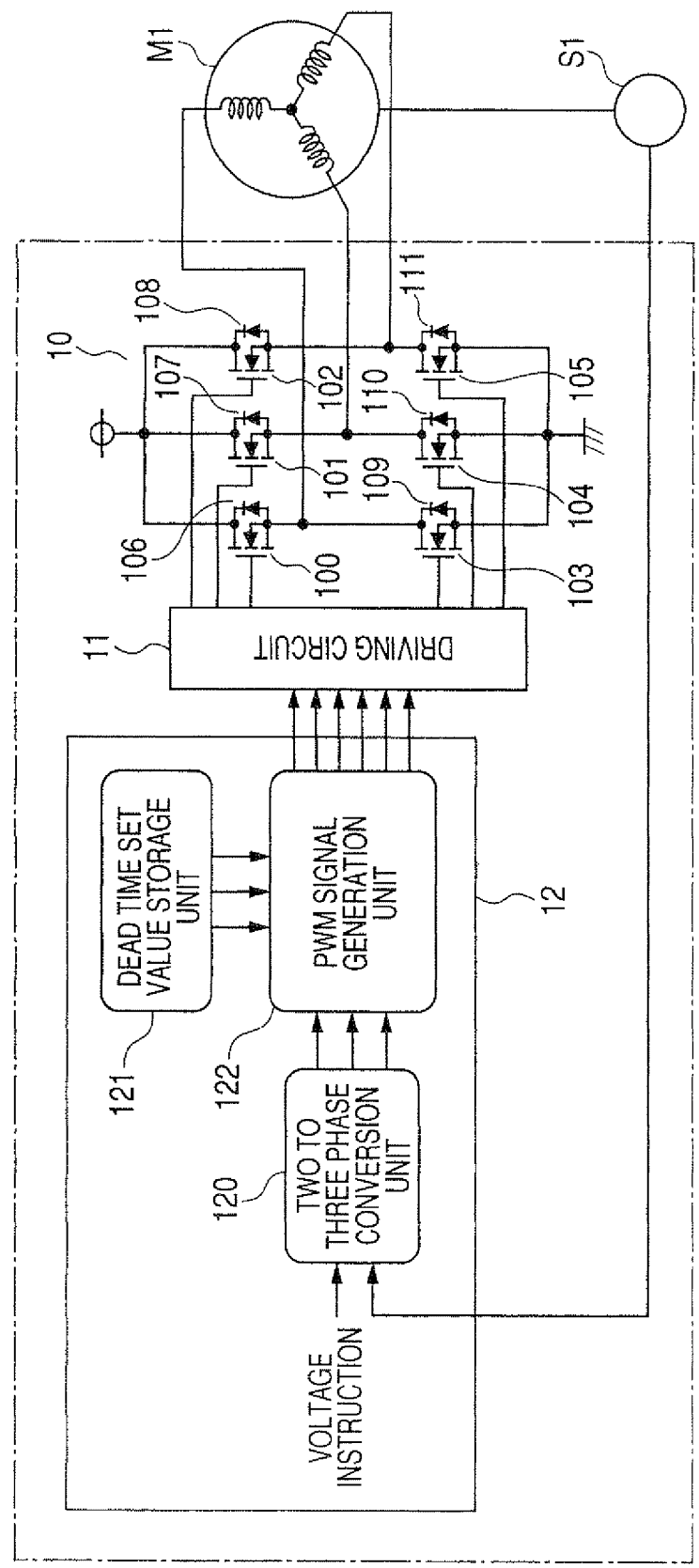
FIG. 1 is a block diagram showing the motor control device according to the first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of the motor control device 1 according to the first embodiment of the present invention with reference to FIG. 1 to FIG. 7.

FIG. 1 is a block diagram showing the motor control device 1 according to the first embodiment.

The motor control device 1 shown in FIG. 1 is a device to control a three phase AC motor M1. The motor control device 1 controls a phase voltage to be supplied to the three phase AC motor M1. The three phase AC motor M1 is equipped with a rotation angle sensor S1.

The three phase AC motor M1 is composed mainly of the three phase bridge circuit 10 (as a multi-phase bridge circuit), a driving circuit 11, and a microcomputer 12 (as a control means).

The three phase bridge circuit 10 is composed of six MOSFETs 100 to 105 (as three pairs of switching elements). The microcomputer 12 instructs the driving circuit 11 to turn the MOSFETs 100 to 105 on and off.

As shown in FIG. 1, each of fly wheel diodes 106 to 111 is placed and connected between the source and drain of corresponding MOSFET. That is, the fly wheel diode is connected between the source and drain of each MOSFET. The MOSFET 100 and the MOSFET 103 form a pair and are connected in series. The MOSFET 101 and the MOSFET 104 form another pair and are connected in series. The MOSFET 102 and the MOSFET 105 form a pair and are also connected in series. In a concrete example, the sources of the MOSFETs 100 to 102 are connected to the drains of the MOSFETs 103 to 105, respectively. The MOSFETs 100 and 103 connected in series correspond to the U phase of the three phase AC motor M1. The MOSFETs 101 and 104 connected in series corresponds to the V phase of the three phase AC motor M1. The MOSFETs 102 and 105 connected in series corresponds to the W phase of the three phase AC motor M1.

The pair of MOSFETs 100 and 103 for the U phase, the pair of the MOSFETs 101 and 104 for the V phase, and the pair of the MOSFETs 102 and 105 for the W phase are connected in parallel.

The drains of the three MOSFETs 100 to 102 are connected to a positive electrode of a power source (not shown) for supplying the electric power to the three phase AC motor M1.

The sources of the three MOSFETs 103 to 105 are connected to a negative electrode of the power source. The gates of the MOSFETs 100 to 105 are connected to the microcomputer 12 through the driving circuit 11.

The MOSFETs 100 and 103 are connected in series at the connection node. The MOSFETs 101 and 104 are connected in series at the connection node. Similarly, the MOSFETs 102 and 105 are connected in series at the connection node. Those connection nodes are connected to the corresponding phase coils, respectively, in the three phase AC motor M1.

The driving circuit 11 receives PWM signals transmitted from the microcomputer 12 (as the control means). Based on the received PWM signals, the driving circuit 11 instructs the MOSFETs 100 to 105 to turn on and off. As described above, those MOSFETs 100 to 105 in the three pairs form the three phase bridge circuit 10.

As shown in FIG. 1, the six input terminals of the driving circuit 11 are connected to the microcomputer 12. The six output terminals of the driving circuit 11 are connected to the corresponding gates of the MOSFETs 100 to 105, respectively.

The microcomputer 12 receives voltage instruction signals transmitted from an outside device (not shown). When receiving the voltage instruction signals, the microcomputer 12 generates the PWM signals based on the received voltage instruction signals. The microcomputer 12 then outputs the PWM signals to the driving circuit 11. The driving circuit 11 controls the on-off operation of the MOSFETs 100 to 105 in the three phase bridge circuit 10. When receiving the PWM signals transmitted from the microcomputer 12 through the driving circuit 11, the MOSFETs 100 to 105 turn on and off according to the PWM signals. As shown in FIG. 1, the microcomputer 12 is composed mainly of a two-three phase conversion unit 120, a dead time set value storage unit 121, and a PWM signal generation unit 122.

When receiving the voltage instruction signal of a two phase transmitted from the outside control device (not shown) and a detection signal transmitted from the rotation angle sensor S1, the three-phase conversion unit 120 converts the received voltage instruction signal of a two phase into a three-phase voltage instruction signal. The three-phase conversion unit 120 then transmits the converted voltage instruction signal of a three phase to the PWM signal generation unit 122.

The dead time set value storage unit 121 stores the dead time set value per each phase which is set based on the detection result of the dead time. The dead time set value storage unit 121 then transmits the dead time set value to the PWM signal generation unit 122.

A description will now be given of the method of actually detecting the dead time of MOSFET with reference to FIG. 2A to FIG. 2C and FIG. 3.

Figure 2A:
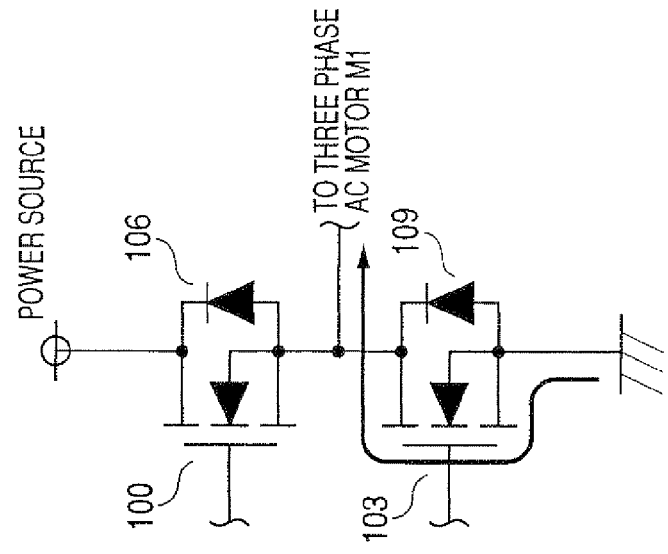
FIG. 2A to FIG. 2C are circuit diagrams showing a method of detecting an actual dead time of MOSFETs in each pair in a three-phase bridge circuit in the motor control device according to the first embodiment of the present invention.
Figure 2B:
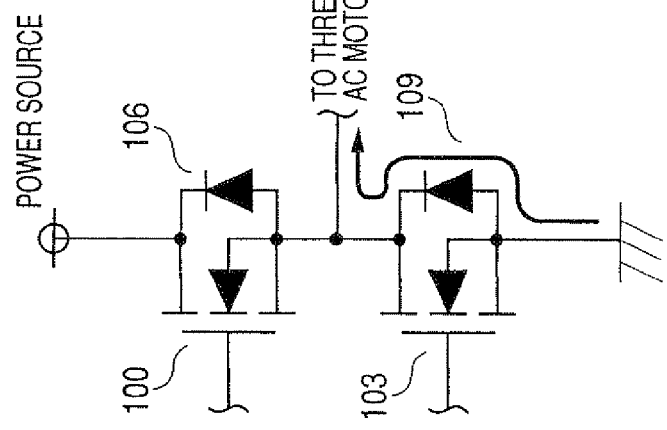
Figure 2C:
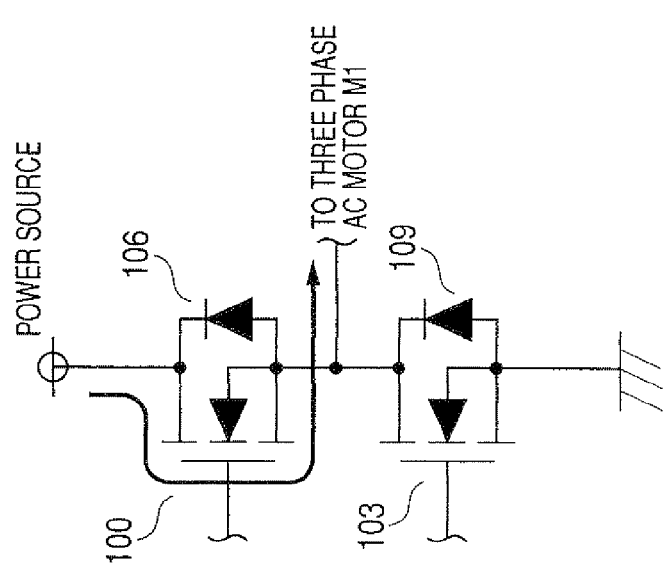

FIG. 2A to FIG. 2C are circuit diagrams showing a method of actually detecting a dead time of MOSFETs in each pair in the three phase bridge circuit 10 in the motor control device 1 according to the first embodiment of the present invention. FIG. 3 a diagram showing a voltage waveform at a connection node between the pair of MOSFETs to explain the method of actually detecting the dead time of the MOSFETs shown in FIG. 2A to FIG. 2C;

The detection of the dead time of the pair of MOSFETs for each phase is performed based on PWM signals transmitted from the microcomputer 12.

As shown in FIG. 2A, the PWM signal, for the actual dead time 5 detection, transmitted from the microcomputer 12 instructs the MOSFET 100 to turn on, and the MOSFET 103 to turn off. This makes the current flow from the positive electrode terminal of the power source to the coil of the three phase AC motor M1 through the MOSFET 100. At this time, as shown in FIG. 3, the voltage at the connection node between the MOSFETs 100 and 10 103 connected in series becomes the voltage of the positive electrode terminal of the power source.

After this, as shown in FIG. 2B, the driving circuit 11 instructs the MOSFETs 100 and 103 to simultaneously turn off for a predetermined period of time. During the turn-off period of the MOSFETs 100 and 103, the current flows from the negative electrode of the power source to the coil of the three phase AC motor M1 through the fly wheel diode 109. At this time, as shown in FIG. 3, the voltage at the connection node between the MOSFETs 100 and 103 connected in series becomes a voltage obtained by decreasing a forward voltage of the fly wheel diode 109 from the voltage of the positive electrode terminal of the power source.

After this, as shown in FIG. 2C, the driving circuit 11 instructs the MOSFET 100 to turn off and the MOSFET 103 to turn on. This makes the current to flow into the coil of the three phase AC motor M1 from the negative electrode of the power source through the MOSFET 103. At this time, as shown in FIG. 3, the voltage at the connection node between the MOSFETs 100 and 103 connected in series becomes the voltage of the negative electrode terminal of the power source.

As described above, it is possible to obtain the actual dead time including a response characteristics of each of the MOSFETs 100 and 103 by detecting the period of time while the voltage of the connection node between the MOSFETs 100 and 103 is decreased from the negative electrode terminal of the power source by the forward voltage of the fly wheel diode 109.

On the other hand, it is possible to actually detect the actual dead time when the current flows from the three phase AC motor M1 to the motor control device 1.

A description will now be given of the method of actually detecting the actual dead time of the MOSFETs in the motor control device 1 according to the first embodiment with reference to FIG. 4A to FIG. 5.

FIG. 4A to FIG. 4C are circuit diagrams showing another method of detecting the actual dead time of the MOSFETs for each pair in the three phase bridge circuit 10 in the motor control device 1 according to the first embodiment of the present invention. FIG. 5 is a diagram showing another waveform to explain the method of detecting the actual dead time of the MOSFETs shown in FIG. 4A to FIG. 4C.

As shown in FIG. 4A, the PWM signal for the actual dead time detection transmitted from the microcomputer 12 instructs the MOSFET 100 to turn on and the MOSFET 103 to turn off. This makes the current to flow from the coil of the three phase AC motor M1 to the positive electrode terminal of the power source through the MOSFET 100. At this time, as shown in FIG. 5, the voltage at the connection node between the MOSFETs 100 and 103 connected in series becomes the voltage of the positive electrode terminal of the power source.

After this, as shown in FIG. 4B, the driving circuit 11 instructs the MOSFETs 100 and 103 to simultaneously turn off for a predetermined period of time. The turn-off period of the MOSFETs 100 and 103 makes the current to flow from the three phase AC motor M1 to the positive electrode terminal of the power source through the fly wheel diode 109. At this time, as shown in FIG. 5, the voltage at the connection node between the MOSFETs 100 and 103 connected in series becomes a voltage obtained by adding a forward voltage of the fly wheel diode 109 to the voltage of the positive electrode terminal of the power source.

After this, as shown in FIG. 4C, the driving circuit 11 instructs the MOSFET 100 to turn off and the MOSFET 103 to turn on. This makes the current flow from the three phase AC motor M1 to the negative electrode terminal of the power source through the MOSFET 103. At this times as shown in FIG. 5, the voltage at the connection node between the MOSFETs 100 and 103 connected in series becomes the voltage of the negative electrode terminal of the power source.

As described above in detail, it is possible to obtain the dead time including a response characteristics of each of the MOSFETs 100 and 103 by detecting the period of time while the voltage of the connection node between the MOSFETs 100 and 103 is increased from the positive electrode terminal of the power source by the forward voltage of the fly wheel diode 109.

The method of detecting the actual dead time can be applied to the pair of MOSFETs 101 and 104 connected in series and the pair of MOSFETs 102 and 105 connected in series for remaining phases.

Finally, the optimum dead time set value per each phase can be obtained based on the detection results of the actual dead time per each phase described above.

Figure 6:
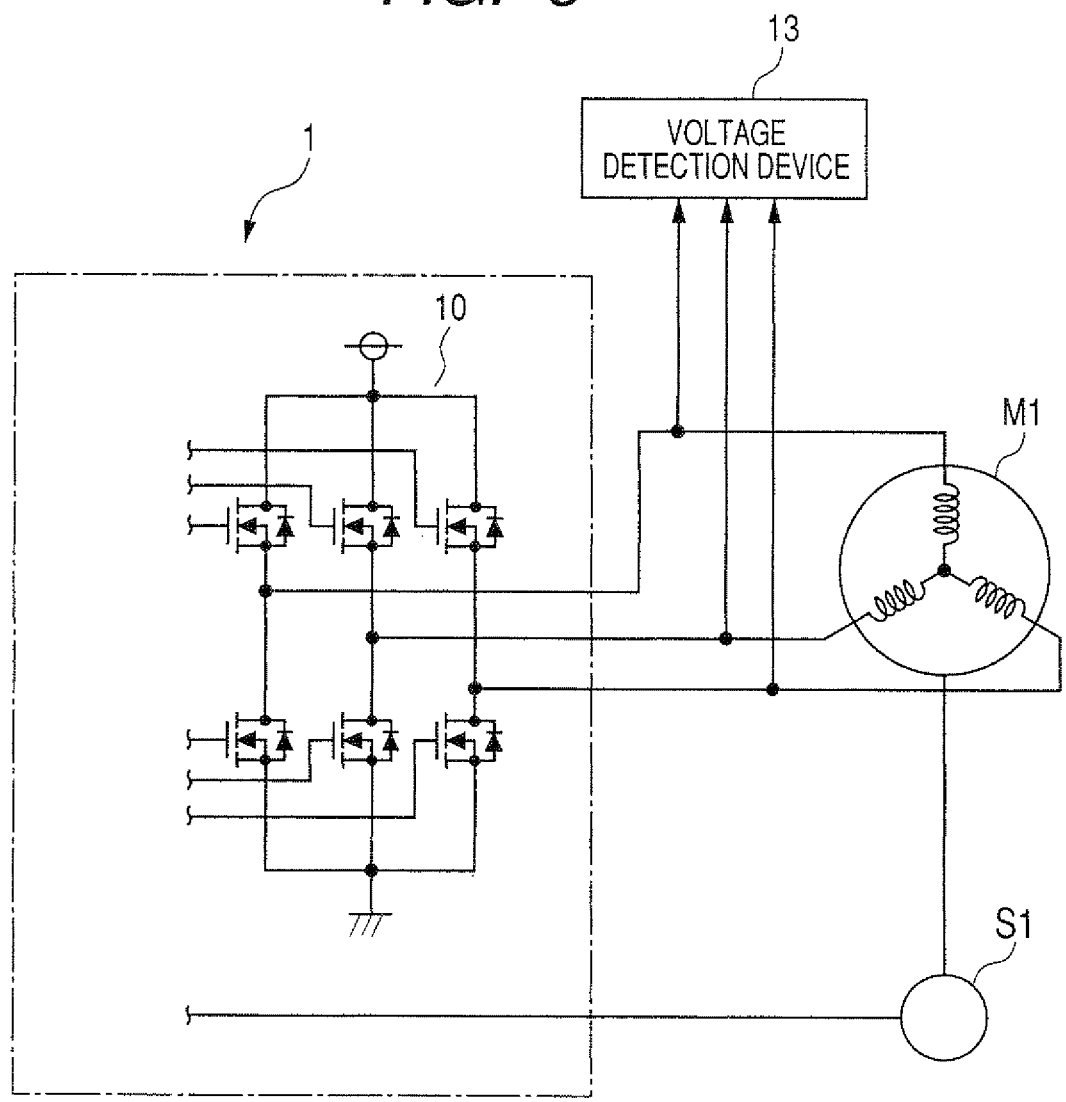
FIG. 6 is a block diagram mainly showing a structure of the three phase bridge circuit in the motor control device and a voltage detecting device according to the first embodiment of the present invention.

FIG. 6 is a block diagram mainly showing a structure of the three phase bridge circuit 10 in the motor control device 1 and the voltage detection device 13 according to the first embodiment of the present invention.

The voltage detection device 13 (as a voltage detection means) detects a voltage at the connection node between each pair of MOSFETs in order to obtain the actual dead time of the MOSFETs in each pair. As shown in FIG. 6, the voltage detection device 13 is connected between the three phase bridge circuit 10 and the three phase AC motor M1.

In a concrete example, an inspector uses the voltage detection device 13 to detect the actual dead time of each pair of MOSFETs for each phase. The voltage detection device 13 obtains the dead time set value based on the detection results of the actual dead time. The obtained dead time set value is stored into the dead time set value storage device 121 shown in FIG. 1.

The PWM signal generation unit 122 shown in FIG. 1 is a functional block capable of generating the PWM signal for each phase based on the three phase voltage instruction value and the dead time set value. The PWM signal generation unit 122 then outputs the PWM signal per each phase to the driving circuit 11.

A description will now be given of the method of generating the PWM signals by the PWM signal generation unit 122 with reference to FIG. 7.

Figure 7:
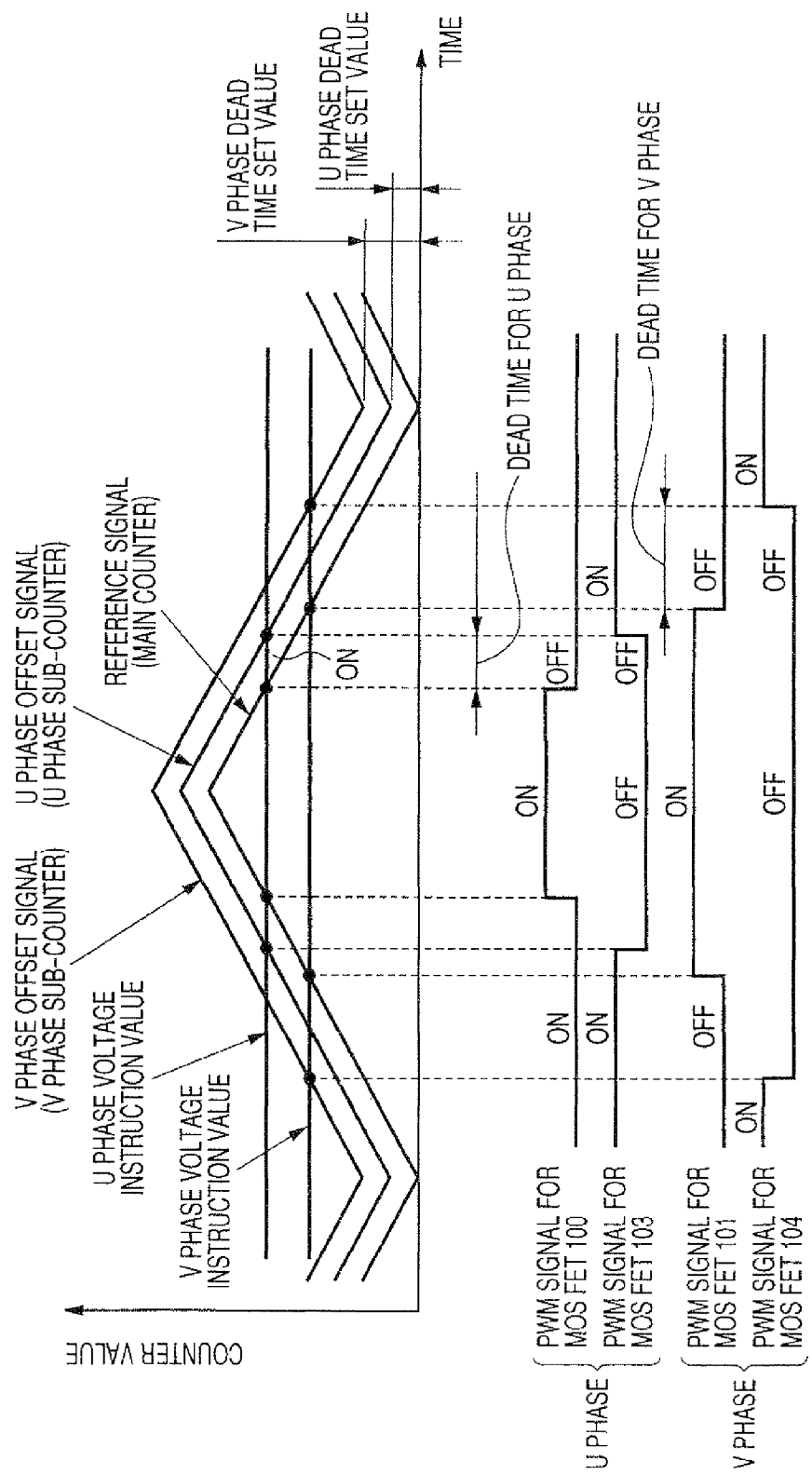
FIG. 7 is a diagram showing the generation of PWM signals in the motor control device according to the present invention.

FIG. 7 is a diagram showing the generation of the PWM signals in the motor control device 1 according to the first embodiment of the present invention. The PWM signal generation unit 122 is composed of a main counter, a U phase sub-counter, a V phase sub-counter, and a W phase sub-counters. Those counters are omitted from the drawings.

As shown in FIG. 7, the main counter generates a reference signal of a triangular wave shape of a predetermined period of time. Each of the U, V, and W sub-counters generates an offset signal obtained by offsetting the reference signal by the dead time set value for the corresponding phase, respectively.

The PWM signal generation unit 122 compares the reference signal with the U phase voltage instruction output from the two-three phase conversion unit 120, and generates the PWM signal in order to turn the MOSFET for U phase on and off. In a concrete example, when the reference signal is not less than the U phase voltage instruction, the PWM signal generation unit 122 generates the PWM signal to instruct the MOSFET 100 to turn on. When the reference signal is less than the U phase voltage instruction, the PWM signal generation unit 122 generates the PWM signal to instruct the MOSFET 100 to turn off.

On the other hand, the PWM signal generation unit 122 compares the U phase offset signal with the U phase voltage instruction, and generates the PWM signal to instruct the MOSFET 103 for U phase to turn on and off. In a concrete example, when the U phase offset signal is not less than the U phase voltage instruction, the PWM signal generation unit 122 generates the PWM signal to instruct the MOSFET 103 to turn off. When the U phase offset signal is less than the U phase voltage instruction, the PWM signal generation unit 122 generates the PWM signal to instruct the MOSFET 103 to turn on. As a result, this sets the dead time corresponding to the U phase dead time set value into the PWM signal for the MOSFETs 100 and 103 for U phase.

The PWM signal generation unit 122 compares the reference signal with the V phase voltage instruction which is output from the two-three phase conversion unit 120, and generates the PWM signal to instruct the MOSFET 101 for V phase. In a concrete example, when the reference signal is not less than the V phase voltage instruction, the PWM signal generation unit 122 generates the PWM signal to instruct the MOSFET 101 to turn on. When the reference signal is less than the V phase voltage instruction, the PWM signal generation unit 122 generates the PWM signal to instruct the MOSFET 101 to turn off.

Further, the PWM signal generation unit 122 compares the V phase offset signal with the V phase voltage instruction, and generates the PWM signal to instruct the MOSFET 104 for V phase to turn on and off. In a concrete example, when the V phase offset signal is not less than the V phase voltage instruction, the PWM signal generation unit 122 generates the PWM signal to instruct the MOSFET 104 to turn off. When the V phase offset signal is less than the V phase voltage instruction, the PWM signal generation unit 122 generates the PWM signal to instruct the MOSFET 104 to turn on. As a result, this sets the dead time corresponding to the V phase dead time set value into the PWM signal for the MOSFETs 101 and 104 for V phase.

In the same manner, the dead time corresponding to the W phase dead time set value is set into each of the PWM signals for the MOSFETs 102 and 105 for W phase. It is thereby possible to set the dead time into the PWM signal for each phase by adjusting the dead time set value.

The PWM signal generation unit 122 handles the reference signal, the offset signals, and the voltage instructions in digital form.

Next, a description will now be given of the operation of the motor control device 1 according to the first embodiment of the present invention with reference to FIG. 1.

When receiving an external instruction such as a voltage instruction signal transmitted from the external device (not shown), the two-three phase conversion unit 120 inputs the two phase voltage instruction signal based on the detection result transmitted from the rotation angle sensor S1. The two-three phase conversion unit 120 then converts the two phase voltage instruction signal to the three phase voltage instruction. The two-three phase conversion unit 120 then outputs the three phase voltage instruction to the PWM signal generation unit 122.

When receiving the three phase voltage instruction, the PWM signal generation unit 122 generates the PWM signal including the dead time for each phase based on the three phase voltage instruction and the dead time set value stored in the dead time set value storage unit 121. The PWM signal generation unit 122 outputs the PWM signal for each phase to the driving circuit 11.

When receiving the PWM signal for each phase, the driving circuit 11 instructs the MOSFETs 100 to 105 to turn on and off in the three phase bridge circuit based on the PWM signal for each phase. This applies the phase voltages into the three phase AC motor M1 based on the voltage instruction, and the current flows in the coil of the three phase AC motor M1. The three phase AC motor M1 generates a predetermined torque.

As described above, the dead time is adjusted for each phase based on the actual dead time as the detection results. It is thereby possible to efficiently use the response characteristics of the MOSFETs 100 to 105, and to expand the available voltage range and the available current range when compared with the structure of the conventional motor control devices.

A description will now be given of actual effects of the motor control device according to the first embodiment of the present invention.

According to the structure of the motor control device of the first embodiment, it is possible to independently adjust the dead time of the pair of MOSFETs for each of the U, V and W phases. It is possible to independently set the optimum dead time corresponding to the response characteristics of the MOSFETs 100 to 105 for each phase. This can use the response characteristics of each of the MOSFETs 100 to 105, and as a result, it is possible to expand the output range of the available voltage and the available current.

Further, according to the first embodiment of the present invention, because the dead time is set for each pair of MOSFETS for each of the U, V, and W phases based on the actual dead times as the detection results, it is possible to set the dead time while taking full advantage of the actual response characteristics of each of the MOSFETs 100 to 105.

Still further, according to the first embodiment of the present invention, because the current flows through the fly wheel diode 109 during the period of the dead time, as previously described, the voltage at the connection node between the MOSFETs connected in series is decreased from the voltage at the negative electrode terminal of the power source by the forward voltage of the fly wheel diode 109. It is thereby possible to detect the actual dead time by detecting the period of time of this voltage drop.

Still further, according to the first embodiment of the present invention, as previously described, because the PWM signal generation unit 122 generates the PWM signal with the dead time that corresponds to the dead time set value obtained by comparing the reference signal and the offset signal with the voltage instruction, the offset signal is generated for each phase based on the dead time set value for each phase. This can compare the reference signal and the offset signal with the voltage instruction per each phase. It is thereby possible to adjust the dead time for each phase with certainly.

In addition, according to the motor control device of the first embodiment, because the PWM signal generation unit 122 processes the reference signal, the offset signal, and the voltage instruction in digital form, it is possible to suppress the fluctuation of the ambient temperature and the supplied voltage and to adjust the dead time for each phase with certainly.

Still further, in the structure of the motor control device according to the first embodiment of the present invention, an operator uses the external voltage detection device 13, and detects the actual dead time to make and set the dead time set value, and finally stores the dead time set value into the dead time set value storage unit 121. The present invention is not limited by the first embodiment.

Figure 8:
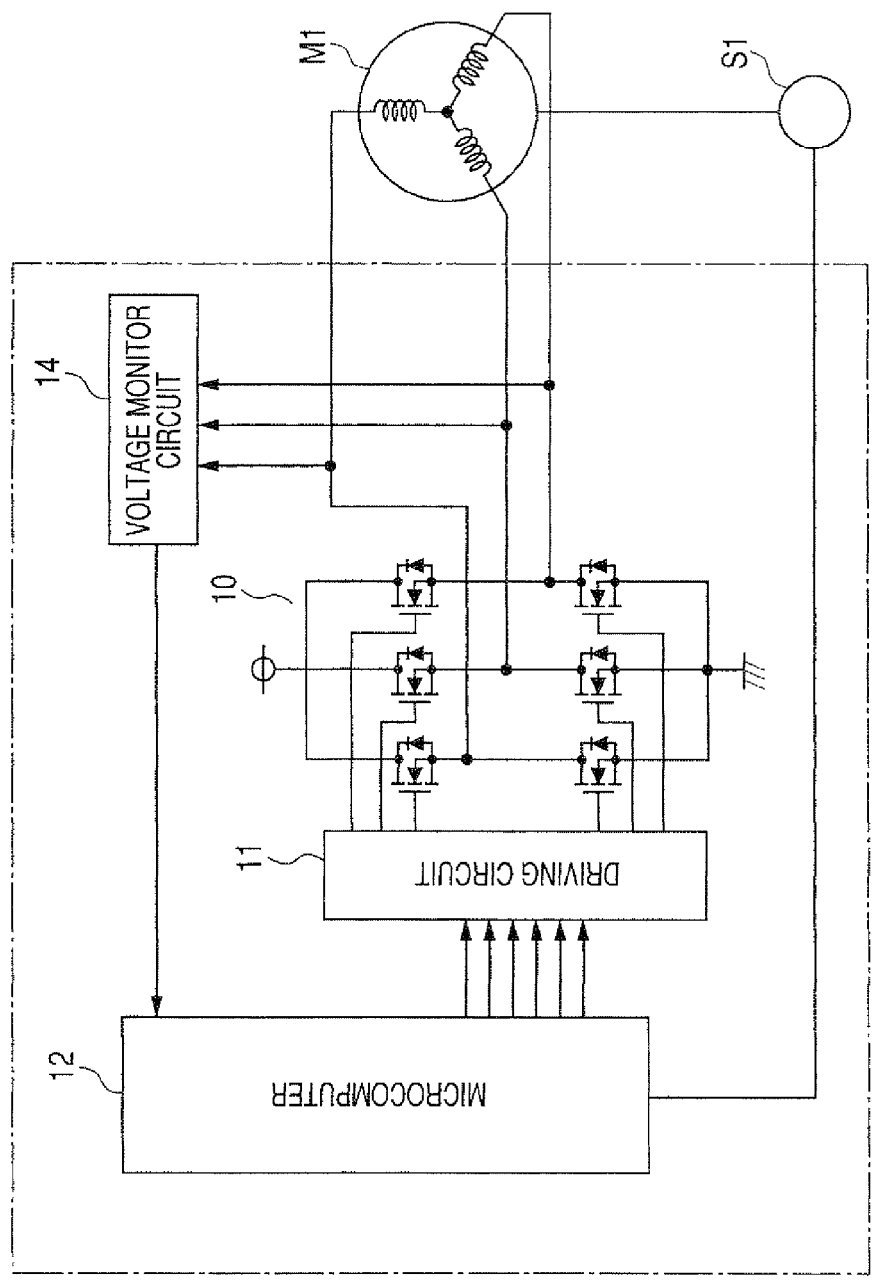
FIG. 8 is a block diagram showing a modification of the circuit structure of the motor control device according to the first embodiment of the present invention.

FIG. 8 is a block diagram showing a modification of the circuit structure of the motor control device 1 according to the first embodiment of the present invention.

As shown in FIG. 8, the motor control device 1 further has a voltage monitor circuit 14 (as the voltage detection means) capable of monitoring each phase voltage of the three phase AC motor M1. The voltage monitor circuit 14 outputs the detected phase voltage to the microcomputer 12. The microcomputer 12 receives the phase voltage transmitted from the voltage monitor circuit 14, and detects the actual dead time based on the detected phase voltage, and sets the dead time set value based on the detected dead time.

Second Embodiment

A description will be given of the motor control device according to the second embodiment of the present invention with reference to FIG. 9.

Figure 9:
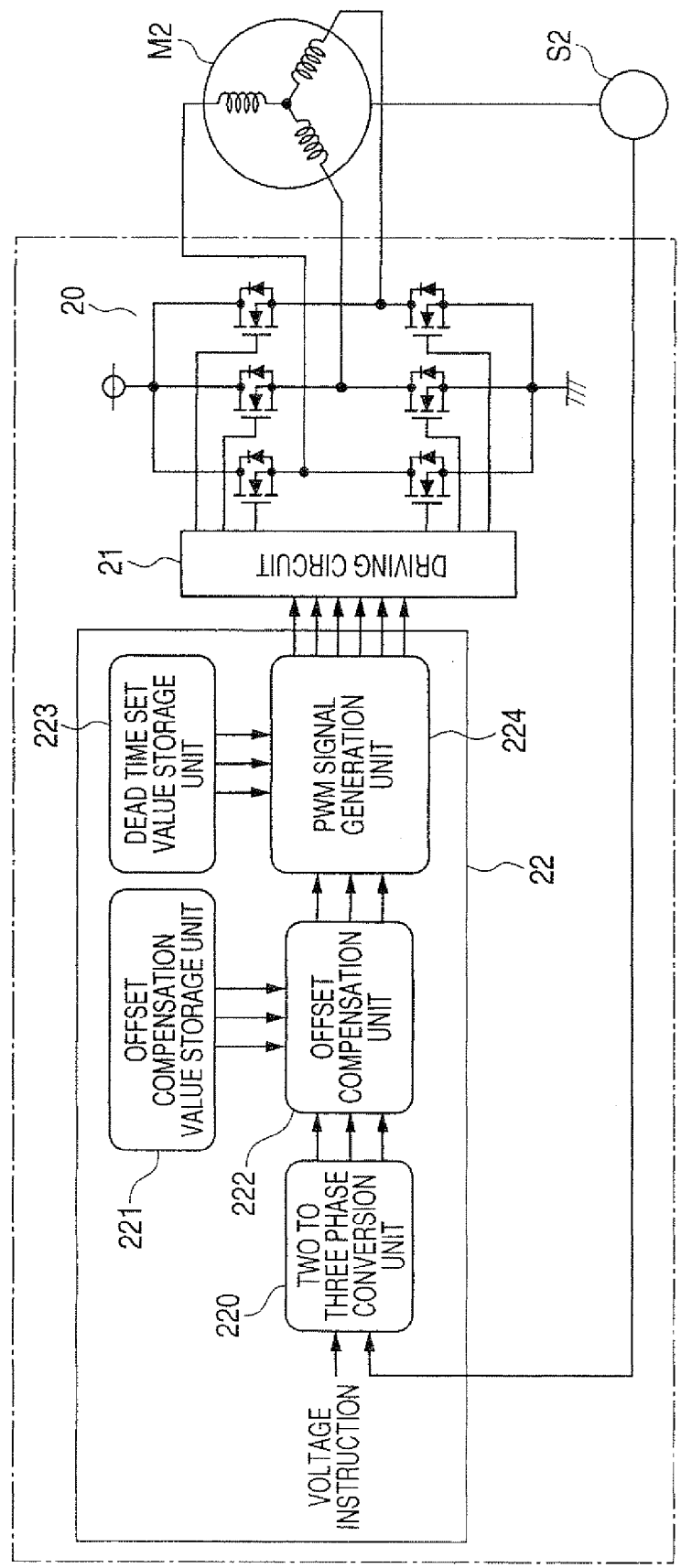
FIG. 9 is a block diagram showing the motor control device according to the second embodiment of the present invention.

FIG. 9 is a block diagram showing the circuit structure of the motor control device 2 according to the second embodiment of the present invention. As shown in FIG. 9, the motor control device 2 is equipped with a microcomputer 22 (as a control means), a driving circuit 21, and a three phase bridge circuit 20 (as the multi-phase bridge circuit). The motor control device 2 controls the operation of a three phase AC motor M2 equipped with a rotation angle sensor S2. The microcomputer 22 is composed mainly of a three-phase conversion unit 290, a dead time set value storage unit 223, a PWM signal generation unit 224, an offset compensation value storage unit 221, and a dead time set value storage unit 223.

The three phase AC motor M2, the rotation angle sensor S2, the three phase bridge circuit 20, and the driving circuit 21 in the second embodiment shown in FIG. 9 are the same in structure, function and operation of the three phase AC motor M1, the rotation angle sensor S1, the three phase bridge circuit 10, and the driving circuit 11, respectively, in the first embodiment shown in FIG. 1. The explanation for those same components is omitted here.

The microcomputer 22 is composed mainly of the three-phase conversion unit 220, the offset compensation value storage unit 221, the offset compensation unit 222, the dead time set value storage unit 223, and the PWM signal generation unit 224.

The offset compensation unit 222, the dead time set value storage unit 223, the PWM signal generation unit 224 in the second embodiment are the same in configuration of the three-phase conversion unit 120, the offset compensation value storage unit 121, and the offset compensation unit 122, respectively.

The offset compensation value storage unit 221 stores the offset value for each phase that is set based on the actual detection results of the offset values of the phase voltages and phase currents of the three phase AC motor M2. The offset compensation value storage unit 221 outputs the offset value for each phase to the offset compensation unit 222.

The offset compensation unit 222 is a functional block capable of inputting the three phase voltage instruction and an offset compensation value, of compensating the three phase voltage instruction based on the offset compensation value, and of outputting the compensated three phase voltage instruction to the PWM signal generation unit 224. In a concrete example, the offset compensation unit 222 compensates the three phase voltage instruction so that the offset of the phase voltage or the phase current of the three phase AC motor M2 is based on the offset compensation value. The offset compensation unit 222 outputs the compensated three phase voltage instruction to the PWM signal generation unit 224.

Next, a description will now be given of the operation of the motor control device 2 according to the second embodiment with reference to FIG. 9.

The offset compensation unit 222 inputs the three phase voltage instruction transmitted from the three-phase conversion unit 220 and the offset compensation value stored in the offset compensation value storage unit 221. The offset compensation unit 222 then compensates the three phase voltage instruction based on the offset compensation value. The offset compensation unit 222 outputs the compensated three phase voltage instruction to the PWM signal generation unit 224.

The PWM signal generation unit 224 receives the compensated three phase voltage instruction transmitted from the offset compensation unit 222, and inputs the dead time set value stored in the dead time set value storage unit 223. The PWM signal generation unit 224 then generates the PWM signals with a dead time for each phase based on the three phase voltage instruction and the dead time set value, and then outputs the generated PWM signals with a dead time per phase to the driving circuit 21.

The following operation of the motor control device 2 according to the second embodiment to control the operation of the three phase AC motor M2 is the same as that of the motor control device 1 according to the first embodiment.

The motor control device 2 according to the second embodiment has an actual effect capable of suppressing the offset of the phase voltage or the phase current of the three phase AC motor M2 because the voltage instruction for each phase is compensated using the offset compensation value so that the offset for the phase voltage or the phase current of the three phase AC motor M2 is suppressed.

Third Embodiment

A description will be given of the motor control device according to the third embodiment of the present invention with reference to FIG. 10.

Figure 10:
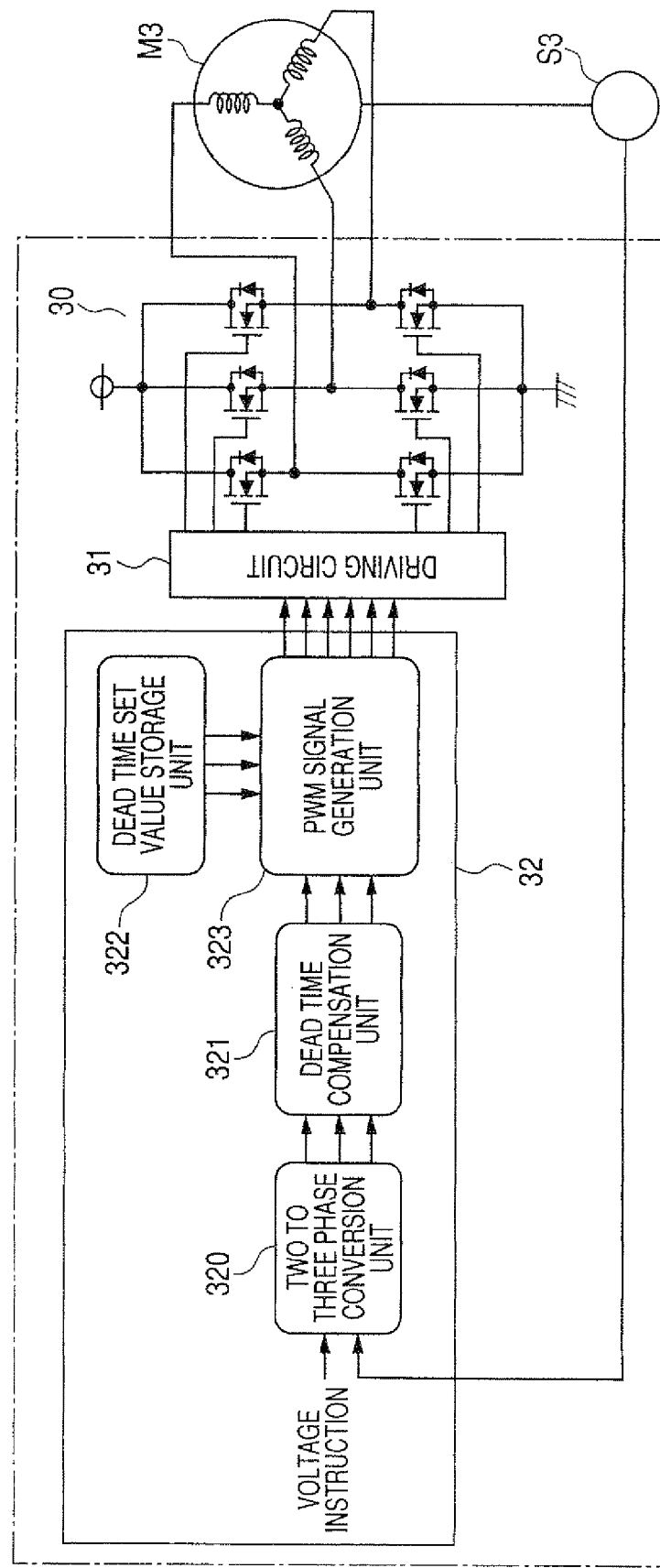
FIG. 10 is a block diagram showing the motor control device according to the third embodiment of the present invention.

FIG. 10 is a block diagram showing the circuit structure of the motor control device 3 according to the third embodiment of the present invention. As shown in FIG. 10, the motor control device 3 according to the third embodiment is equipped with a microcomputer 32 (as a control means), a driving circuit 31, and a three phase bridge circuit 30 (as the multi-phase bridge circuit). The motor control device 3 controls the operation of a three phase AC motor M3 equipped with a rotation angle sensor S3.

The three phase AC motor M3, the rotation angle sensor S3, the three phase bridge circuit 30, and the driving circuit 31 in the third embodiment shown in FIG. 10 are the same in structure, function and operation of the three phase AC motor M1, the rotation angle sensor S1, the three phase bridge circuit 10, and the driving circuit 11 in the first embodiment shown in FIG. 1. The explanation for those same components is omitted here.

The microcomputer 32 is composed mainly of a three-phase conversion unit 320, a dead time compensation unit 321, a dead time set value storage unit 322, and a PWM signal generation unit 323.

The three-phase conversion unit 320, the dead time set value storage unit 322, and the PWM signal generation unit 323 are the same in configuration as the three-phase conversion unit 120, the dead time set value storage unit 121, and the PWM signal generation unit 122, respectively.

The dead time compensation unit 321 is a functional block capable of inputting the three phase voltage instruction and of compensating the three phase voltage instruction according to dead time by a predetermined arithmetic equation. The dead time compensation unit 321 then outputs the compensated three phase voltage instruction value to the PWM signal generation unit 323. In a concrete example, the dead time compensation unit 321 compensates the three phase voltage instruction using the predetermined arithmetic equation so that a deviation of the phase voltage or the phase current of the three phase AC motor M3 caused by the dead time is suppressed.

Next, a description will now be given of the operation of the motor control device 3 according to the third embodiment of the present invention with reference to FIG. 10.

The dead time compensation unit 321 compensates the three phase voltage instruction transmitted from the three-phase conversion unit 320 considering the dead time by the predetermined arithmetic equation, and outputs the compensated three phase voltage instruction to the PWM signal generation unit 323.

When receiving the compensated three phase voltage instruction transmitted from the dead time compensation unit 321 and the dead time set value stored in the dead time set value storage unit 322, the PWM signal generation unit 323 generates the PWM signals for each phase based on the three phase voltage instruction and the dead time set value, and then outputs the PWM signals for each phase to the driving circuit 31.

The following operation of the motor control device 3 according to the third embodiment to control the operation of the three phase AC motor M3 is the same as that of the motor control device 1 according to the first embodiment.

The motor control device 3 according to the third embodiment has an actual effect capable of suppressing the deviation of the phase voltage or the phase current of the three phase AC motor M3 which is generated by the dead time because the voltage instruction for each phase is compensated using the dead time compensation value so that the deviation for the phase voltage or the phase current of the three phase AC motor M3 caused by using the dead time is suppressed.

Fourth Embodiment

A description will be given of the motor control device according to the fourth embodiment of the present invention with reference to FIG. 11.

Figure 11:
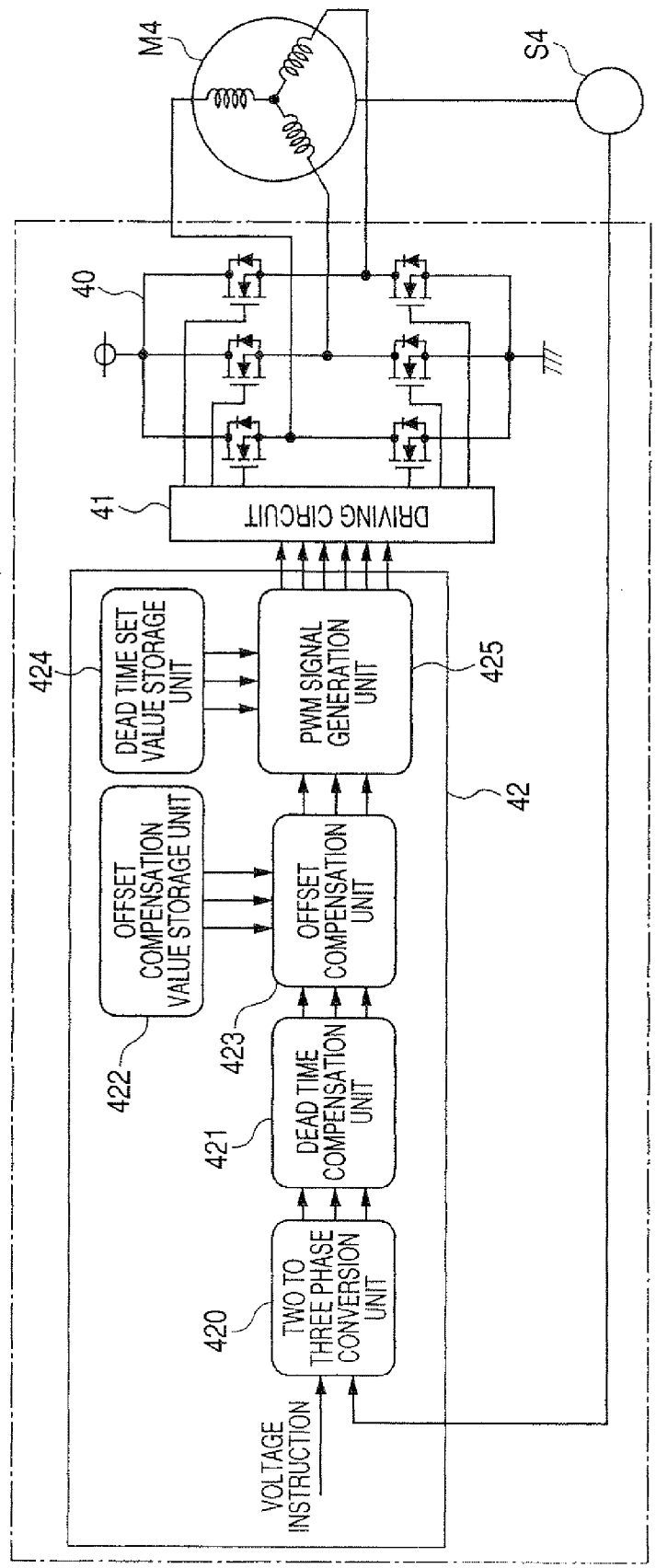
FIG. 11 is a block diagram showing the motor control device according to the fourth embodiment of the present invention.

FIG. 11 is a block diagram showing the circuit structure of the motor control device 4 according to the fourth embodiment of the present invention. That is, the configuration of the motor control device 4 according to the fourth embodiment shown in FIG. 11 is a combination of the motor control devices 2 and 3 according to the second and third embodiments shown in FIG. 9 and FIG. 10.

As shown in FIG. 1 the motor control device 4 according to the fourth embodiment is equipped with a microcomputer 42 (as a control means), a driving circuit 41, and a three phase bridge circuit 40 (as the multi-phase bridge circuit). The motor control device 4 controls the operation of a three phase AC motor M4 equipped with a rotation angle sensor S4. The microcomputer 42 is composed mainly of a three-phase conversion unit 420, a dead time compensation unit 421, an offset compensation value storage unit 422, an offset compensation unit 423, a dead time set value storage unit 424, and a PWM signal generation unit 425.

The three phase AC motor M4, the rotation angle sensor S4, the three phase bridge circuit 40, and the driving circuit 41 in the fourth embodiment shown in FIG. 11 are the same in structure, function and operation of the three phase AC motor M1, the rotation angle sensor S1, the three phase bridge circuit 10, and the driving circuit 11, respectively, in the first embodiment shown in FIG. 1. The explanation for those same components is omitted here.

The microcomputer 42 is composed mainly of the three-phase conversion unit 420, the dead time compensation unit 421, the offset compensation unit 423, the offset compensation value storage unit 422, the dead time set value storage unit 424, and the PWM signal generation unit 425.

The three-phase conversion unit 420, the dead time set value storage unit 424, and the PWM signal generation unit 425 in the fourth embodiment are the same in configuration of the three-phase conversion unit 120, the dead time set value storage unit 121, and the PWM signal generation unit 122, respectively, according to the first embodiment shown in FIG. 1.

The dead time compensation unit 421 is a functional block capable of inputting the three phase voltage instruction and of compensating the three phase voltage instruction according to dead time by a predetermined arithmetic equation. The dead time compensation unit 421 then outputs the compensated three phase voltage instruction value to the offset compensation unit 423. In a concrete example, the dead time compensation unit 421 compensates the three phase voltage instruction using the predetermined arithmetic equation so that a deviation of the phase voltage or the phase current of the three phase AC motor M4 caused by the dead time is suppressed.

The offset compensation value storage unit 422 is a functional block capable of storing the offset compensation value for each phase that is set based on the actual detection results of the offset for the phase voltage or the phase current of the three phase AC motor M4. The offset compensation value storage unit 422 outputs the offset compensation value for each phase to the offset compensation unit 423.

The offset compensation unit 423 is a functional block capable of further offset-compensating the three phase voltage instruction value (which has been compensated according to the dead time by the dead time compensation unit 421 and transmitted from the dead time compensation unit 421) based on the offset compensation value stored in the offset compensation value storage unit 422. The offset compensation unit 423 then outputs the compensated three phase voltage instruction value to the PWM signal generation unit 425. In a concrete example, the offset compensation unit 423 compensates the three phase voltage instruction (which has been compensated according to the dead time by the dead time compensation unit 421) using the offset compensation value and outputs the compensated three phase voltage instruction to the PWM signal generation unit 425.

Next, a description will now be given of the motor control device 4 according to the fourth embodiment of the present invention with reference to FIG. 11.

The dead time compensation unit 421 compensates the three phase voltage instruction value transmitted from the three-phase conversion unit 420 according to the dead time using the predetermined arithmetic equation. The dead time compensation unit 421 then outputs the compensated three phase voltage instruction value to the offset compensation unit 423.

When receiving the compensated three phase voltage instruction value transmitted from the dead time compensation unit 421, the offset compensation unit 423 further compensates the received three phase voltage instruction value based on the offset compensation value stored in the offset compensation value storage unit 422. The offset compensation unit 423 then outputs the compensated three phase voltage instruction value to the PWM signal generation unit 425. When receiving the three phase voltage instruction value compensated by and transmitted from the offset compensation unit 423, the PWM signal generation unit 425 generates the PWM signals for each phase based on the three phase voltage instruction value and the dead time set value stored in the dead time set value storage unit 424, and outputs the PWM signals for each phase to the driving circuit 41.

The following operation of the motor control device 4 according to the fourth embodiment to control the operation of the three phase AC motor M4 is the same as that of the motor control device 1 according to the first embodiment.

The motor control device 4 according to the fourth embodiment has an actual effect capable of suppressing the deviation of the phase voltage or the phase current of the three phase AC motor M4 which is generated by the dead time because the voltage instruction for each phase is compensated using the dead time compensation value so that the deviation for the phase voltage or the phase current of the three phase AC motor M4 caused by using the dead time is suppressed. Still further the motor control device 4 according to the fourth embodiment has an actual effect capable of suppressing the offset of the phase voltage or the phase current of the three phase AC motor M4 because the voltage instruction (which has been compensated according to the dead time) for each phase is compensated using the offset compensation value so that the offset for the phase voltage or the phase current of the three phase AC motor M4 is suppressed.

In the fourth embodiment described above and the first to third embodiments previously described, the motor control devices 1 to 4 are equipped with the three phase bridge circuit 10, 20, 30, and 40 in order to control the operation of the three phase AC motors M1 M2, M3, and M4, respectively. The present invention is not limited by the structure of the motor control devices 1 to 4 according to the first to fourth embodiments. It is possible to apply the motor control device according to the present invention to a multi-phase AC motor equipped with multi-phase bridge circuit other than the three-phase bridge circuit.

OTHER FEATURES AND EFFECTS OF THE PRESENT INVENTION

In the motor control device as another aspect of the present invention, the control means adjusts the dead time of the pair of switching elements for each phase of the motor based on an actual dead time of the pair of switching elements for each phase of the motor that is actually detected. This structure of the motor control device can adjust the dead time of the switching elements for each phase while taking full advantage of the actual response characteristics of each switching element.

In the motor control device as another aspect of the present invention, each switching element is equipped with a fly wheel diode, and the control means detects the actual dead time of the switching elements for each phase of the motor based on voltages at a connection node between the pair of switching elements connected in series for each phase.

In the configuration of the motor control device according to the present invention, one of the switching elements in the pair is turned on, the current flows through this turned-on switching element. After this, both the switching elements in the pair are simultaneously turned off during the dead time, the current flows through the fly wheel diode placed for the other switching element in the pair. Following, the other switching element is turned on, the current flows through this turned-on switching element. During the period of the dead time, the current flows through the fly wheel diode. For example, in the phase of the motor where the current flows from the motor control device to the motor, the voltage at the connection node between the pair of switching elements connected in series is slightly increased. Accordingly, it is thereby possible to detect the period of the actual dead time with certainty based on the voltage detected at the connection node between the switching elements in each pair connected in series.

In the configuration of the motor control device according to the present invention, the control means generates a reference signal of a predetermined period of time and an offset signal obtained by offsetting the reference signal by an offset value for each phase. The control means compares the reference signal and the offset signal with an instruction signal for each phase of the motor in order to generate a driving signal having the dead time to turn the switching elements for each phase on and off. The control means adjusts the dead time of the switching elements for each phase by specifying the offset value for each phase. The configuration of the motor control device according to the present invention can adjust the dead time for each phase with certainty.

In the configuration of the motor control device according to the present invention, the control means performs processes the reference signal, the offset signal, and the instruction signal in digital form. The configuration of the motor control device according to the present invention can adjust the dead time for each phase while suppressing the fluctuation of a temperature, a voltage, and the like.

In the configuration of the motor control device according to the present invention, the control means compensates the instruction signal for each phase using the offset value so that the offset of a phase voltage or a phase current of the motor is suppressed. The configuration of the motor control device according to the present invention can suppress the offset of the phase voltage or the phase current of the motor.

In the configuration of the motor control device according to the present invention, the control means compensates the instruction signal for each phase using the offset value so that a deviation of a phase voltage or a phase current of the motor caused by the dead time is suppressed. The configuration of the motor control device according to the present invention can suppress the deviation of the phase voltage or the phase current of the motor caused by using the dead time.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A motor control device for controlling the operation of a motor comprising:

a multi-phase bridge circuit comprised of a plurality of pairs of switching elements in which a pair of switching elements connected in series is provided for each phase of the motor, and the pairs of switching elements for multi-phases of the motor are connected in parallel, and a connection node between the switching elements in each pair being connected to the motor; and a microcomputer configured to set a dead time for the pair of switching elements connected in series for each phase of the motor in order to simultaneously turn the pair of switching elements for each phase off, and the microcomputer instructing the switching elements to turn on and off and adjusting the dead time for the pair of switching elements for each phase in order to control the operation of the motor, each switching element is equipped with a fly wheel diode, the microcomputer detects the actual dead time of the pair of switching elements for each phase of the motor based on voltages at a connection node between the pair of switching elements connected in series for each phase, and the microcomputer adjusts the dead time of the pair of switching elements for each phase of the motor on the basis of an actual dead time of the pair of switching elements for each phase of the motor which is actually detected.

2. The motor control device for controlling the operation of a motor according to claim 1, wherein the microcomputer adjusts the instruction signal for each phase using the offset value so that the offset of a phase voltage or a phase current of the motor is suppressed.

3. The motor control device for controlling the operation of a motor according to claim 1, wherein the microcomputer adjusts the instruction signal for each phase using the offset value so that a deviation of a phase voltage or a phase current of the motor caused by the dead time is suppressed.

* * * * *